United States Patent [19]
Arai et al.

[11] Patent Number: 4,782,474
[45] Date of Patent: Nov. 1, 1988

[54] TRACKING SERVO SYSTEM FOR CONTROLLABLY PROJECTING AN OPTICAL BEAM ON AN OPTICAL DISK

[75] Inventors: Shigeru Arai, Zushi; Toshitaka Iwamoto, Kawasaki, both of Japan

[73] Assignee: Fujitsu Limited, Kawasaki, Japan

[21] Appl. No.: 824,277

[22] Filed: Jan. 30, 1986

[30] Foreign Application Priority Data

| | | |
|---|---|---|
| Jan. 31, 1985 [JP] | Japan | 60-18024 |
| May 30, 1985 [JP] | Japan | 60-118532 |
| Aug. 3, 1985 [JP] | Japan | 60-171615 |
| Aug. 3, 1985 [JP] | Japan | 60-171616 |

[51] Int. Cl.$^4$ .............................................. G11B 7/095
[52] U.S. Cl. ........................................ 369/44; 369/45; 369/119; 369/46; 250/201; 250/202
[58] Field of Search ............... 369/44, 45, 112, 119, 369/46; 250/201, 202

[56] References Cited

U.S. PATENT DOCUMENTS

| | | | |
|---|---|---|---|
| 4,198,657 | 4/1980 | Kanamow | 369/112 |
| 4,423,496 | 12/1983 | Opheij | 369/44 |
| 4,467,463 | 8/1984 | Yano | 369/44 |
| 4,589,102 | 5/1986 | Volleau | 369/44 |
| 4,607,356 | 8/1986 | Pricot | 369/119 |
| 4,607,357 | 8/1986 | Oharo | 369/44 |
| 4,634,853 | 1/1987 | Kanamow | 369/44 |

OTHER PUBLICATIONS

Maeda et al., "A Tracking System for Obtaining a Fixed Image on an Optical Disk", Conference Bulletin, Japanese Applied Physics Society, Apr. 1983.
Bricot et al., "Optical Readout of Videodisc", IEEE Transactions on Consumer Electronics, Nov. 1976, p. 304.

Primary Examiner—Alan Faber
Attorney, Agent, or Firm—Staas & Halsey

[57] ABSTRACT

An optical storage apparatus for storing and reading information on an optical disk with an optical beam, including a tracking servo system having an objective lens, which is driven in a focusing direction F and a tracking direction T by a lens actuator, and a tilting mirror, which is rotated by a mirror actuator. The tracking servo system eliminates beam shift by controlling the lens actuator and the mirror actuator to position the lens and the mirror so that the laser beam always passes through a back focal point of the lens located on the opposite side of the lens from the optical disk. As a result, the laser beam proceeds from the lens to the disk along a path which is parallel with the optical axis of the lens and strikes the disk perpendicularly. Accordingly, the return path of the laser beam reflected by the surface of the disk coincides with the incident path of the laser beam, and no beam shaft is experienced.

13 Claims, 8 Drawing Sheets

TRACKING SERVO SYSTEM FOR CONTROLLABLY PROJECTING AN OPTICAL BEAM ON AN OPTICAL DISK

BACKGROUND OF THE INVENTION

1. Field of the Invention

The present invention relates to an optical storage apparatus for storing information, in the form of a large number of pits, on the surface of an optical disk, the pits being aligned in tracks. The present invention further relates to a servo system for tracking an optical beam, such as a laser beam, on the surface of an optical disk to read out information stored on the disk or to write information on the disk.

2. Description of the Related Art

Optical storage devices usually store binary signals in the form of a large number of pits aligned in circular tracks on an optical disk. The tracks may be pregrooves (not shown) which are raised from the surface of the disk. The information is optically read out by scanning the disk with a laser beam having a diameter on the order of 1 $\mu$m. The stored information is read by sensing (or detecting) the laser beam after it is reflected and modulated by the surface of the disk. The beam is modulated by optical defraction due to the presence of the pits formed on the optical disk.

The use of an optical storage medium, i.e., an optical disk, is desirable because it is possible to achieve a much higher signal density with an optical storage medium than with a magnetic storage medium; a high signal density being achieved because of the fine and precise structure of the optical medium which forms the optical disk. Further, the pitch of the tracks is substantially small, typically 1.6 $\mu$m, and the size of the pits aligned on the tracks is on the order of 0.1 $\mu$m. Thus, to accurately read information from an optical disk, a laser beam must be precisely focused and centered on a track. Consequently, an accurate servo system is required to focus and center the laser beam on a track.

The tracks on an optical disk may be eccentric, mainly due to insufficient dimensional preciseness of the disk, and have positional variations of up to 100 $\mu$m. Thus, the tracks on a rotating disk have periodic and wide ranging positions in the radial direction, which creates substantial difficulty in performing accurate tracking. In addition, an objective lens with a high numerical aperture, such as 0.5, is utilized to detect, or perceive, extremely fine details, leading to a very small depth of field, on the order of several $\mu$m. Further, the disk surface may have variations in the vertical direction on the order of 100 $\mu$m due to the distortion of the disk, leading to difficulty in focusing.

In spite of the above-mentioned adverse conditions, the laser beam must be tracked with an accuracy of approximately 0.1 $\mu$m in order to avoid cross-talk, and the laser beam must be focused on the surface with an accuracy of approximately 0.1 $\mu$m. Thus, an accurate servo system for centering a laser beam on the track is the key to an optical storage apparatus. Various servo systems for focusing and tracking an optical beam have been developed and are reported in references such as "Optical Readout of Video Disks," by C. Bricot et al., IEEE Transaction C.E., November 1976, p. 304.

Tracking servo systems also experience problems due to "beam shift" which is inherent in most conventional optical systems employed in optical storage devices. "Beam shift" is enhanced by a mechanical hazard referred to as "skew" of the disk surface, caused by slight radial distortions, usually convex, of optical disks. Optical servo systems are designed so that the incident laser beam is perpendicular to the disk surface; accordingly, the reflected laser beam follows the same path as the incident laser beam. If the incident laser beam is not perpendicular to the surface of the disk, the return path of the reflected laser beam will be different from the path of the incident laser beam, resulting in beam shift which adversely affects the tracking servo system.

Conventional servo systems are described below, with reference to FIGS. 1–3, in order to explain beam shift.

Figure 1:
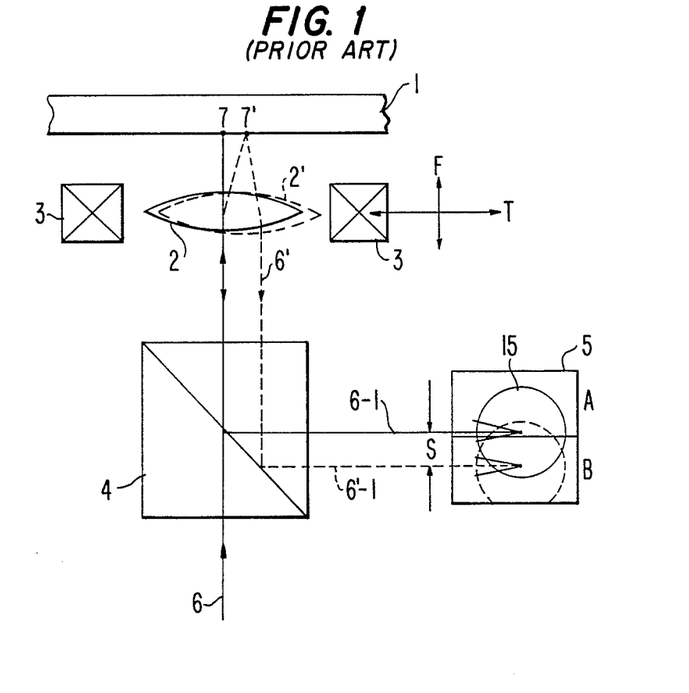
FIG. 1 is a schematic diagram of a conventional tracking servo system for an optical storage apparatus.
Figure 2:
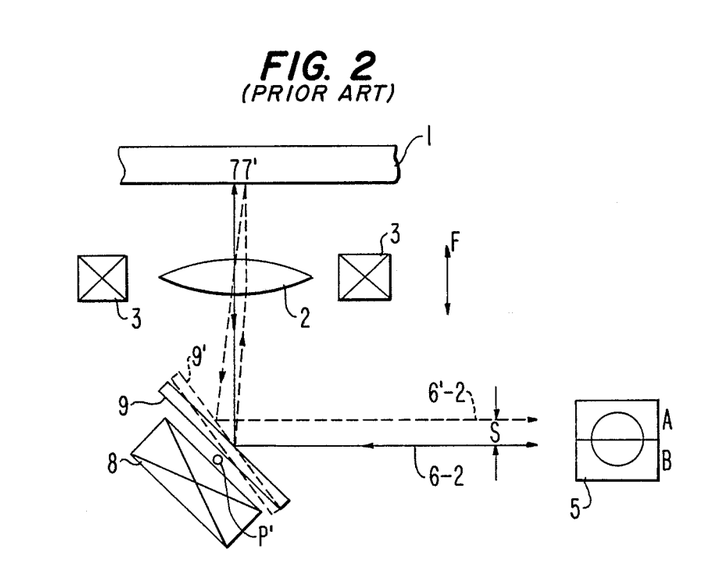
FIG. 2 is a schematic diagram of another conventional tracking servo system for an optical storage apparatus.

FIG. 1 is a schematic block diagram of one example of a conventional system for obtaining tracking error signals. This system includes an objective lens 2 and an actuator 3 for driving the objective lens 2. The actuator 3 includes electrodynamic coils, similar to those used in audio speakers, to drive the lens 2 in a tracking direction T in accordance with tracking error signals, and in a focus direction F in accordance with focus error signals. The actuator 3 is referred to as a two-dimensional actuator. A laser beam 6 following a beam path perpendicular to the disk 1 passes through a beam splitter 4 and is focused on the disk 1 by lens 2 to form a focal point 7. The laser beam is then reflected and follows the path of the incident laser beam. Subsequently, a portion, or part, of the laser beam is deflected at a right angle by the beam splitter 4 and follows beam path 6-1 to a photosensor 5 comprising two sub-photosensors A and B. The aperture of the objective lens 2 forms a spot 15 at a fixed position on the photosensor 5. When the laser beam 6 is not well centered on the track, the intensity distribution of the laser beam over the spot 15 is asymmetrical due to the optical defraction of the deflected laser beam. The asymmetry of the beam intensity is sensed by the photosensor 5 and converted into tracking error signals by a differential amplifier (not shown) connected to sub-photosensors A and B. This method of generating tracking error signals is referred to as a "push-pull" method.

The occurrence of beam shift will now be described. When lens 2 is moved to a different position, as shown by the dotted lines and reference numeral 2' in FIG. 1, by the actuator 3 in accordance with a tracking error signal, the focal point 7 of the lens is moved to a new position 7'. Thus, the path of the incident laser beam is not perpendicular with the surface of the disk 1. Consequently, the reflected laser beam follows a dotted line path 6'-1 and is shifted by a distance s from the original path 6-1. This is the phenomenon of beam shift. As a result, the optical axis of the laser beam incident on the photosensor 5 is shifted by the distance s, and the intensity distribution of the laser beam over the spot 15 is changed, generating an off-set (a fixed deviation of the value of the signal current) in the tracking error signals.

Therefore, it is impossible to perform an exact servo tracking operation.

Another example of beam shift will be described with reference to FIG. 2. The tracking servo system of FIG. 2 has two actuators, a focus servo actuator and a tracking servo actuator 8. An objective lens 2 is driven only in a focusing direction F by the servo focusing actuator 3' to focus the laser beam 6, which follows a path 6-2, on the disk 1. The laser beam 6 is tracked by pivoting mirror 9, and a servo tracking actuator 8, driven by a tracking error signal, controllably rotates the mirror 9 around a pivot axis P'. When the center of a track is in line with the optical axis of lens 2, a laser beam 6 following the solid line path 6-1 is perpendicular to the disk 1 and the reflected laser beam will return along path 6-2. However, when the eccentricity of the disk 1 causes the track to move to a different position 7', the mirror 9 must be rotated to a new position 9', shown by the dotted lines in FIG. 2, and the laser beam 6 follows optical path 6'-2, shown by the dotted line. In this case the laser beam incident on the disk 1 is not perpendicular to the surface of the disk 1, and thus a beam shift of a distance s results in an erroneous tracking error signal.

In order to alleviate beam shift, an improved structure for a tilting mirror has been proposed by Maeda et al. in the conference bulletin of the Japanese Applied Physics Society, 7P-X-8, April 1983. The blook diagram of FIG. 3 illustrates this structure, in which the pivot axis 12 of a tilting mirror 13, which is driven by a mirror actuator 14, is located on a back focal plane 11 of the objective lens 2. The back focal plane 11 is a plane which is parallel to the surface of the disk 1 and which includes a back focal point 10 of lens 2, the back focal point of lens 2 being on the opposite side of lens 2 from disk 1. A laser beam 6, following beam path 6-3, is deflected by tilting mirror 13 to pass in the immediate vicinity of the back focal point 10 of lens 2. As a result, the beam shift is negligibly small. The lens 2, however, is moved in a focusing direction F by a focusing actuator 3. This movement of the lens 2 results in a small discrepancy between the pivot axis 12 of the tilting mirror 13 and the back focal plane 11 of lens 2. The beam shift due to the discrepancy of the back focal plane 11 and the pivot point 12 has been shown to be negligibly small. Thus, the improved structure of the tilting mirror 13 provides a solution to the problem of beam shift in a tracking servo system. However, the tilting mirror 13, including its associated actuator 14, is rather large, adversely affecting the ability of the servo apparatus to respond to a tracking error signal of high frequency. The size of the tiling mirror 13 also adversely affects the density of the components of the servo apparatus.

In addition to the aforesaid problems inherent to optical tracking servo systems, the skew of the optical disk 1 is a problem which is difficult to overcome. Accordingly, it is important to alleviate the problem of beam shift.

SUMMARY OF THE INVENTION

An object of the present invention is provide a tracking servo system for an optical storage apparatus which is capable of generating a precise tracking error signal.

Another object of the present invention is to provide a tracking servo system for an optical storage apparatus which eliminates beam shift to provide an accurate tracking error signal.

It is a further object of the present invention to provide a reliable servo system for an optical storage apparatus.

The optical storage apparatus of the present invention includes an objective lens, which is driven in a focusing direction F and a tracking direction T by a lens actuator, and a tilting mirror (hereinafter referred to as a "mirror") which is rotated by a mirror actuator. In order to eliminate beam shift, the lens actuator and the mirror actuator control the lens and the mirror so that the laser beam always passes through the back focal point of the lens. As a result, the laser beam proceeds from the lens to the disk in a path which is parallel with the optical axis of the lens, and thus strikes the disk perpendicularly. Accordingly, the return path of the laser beam reflected by the surface of the disk coincides with the incident path of the laser beam, and no beam shift is experienced.

The optical storage apparatus of the present invention may also include a skew detector for detecting the skew, or inclination, of the disk so that the angle of the mirror can be changed to compensate for the skew of the disk.

These together with other objects, features and advantages of the present invention will be apparent as more fully described and claimed with reference to the accompanying drawings, wherein like reference numerals refer to like parts.

DESCRIPTION OF THE PREFERRED EMBODIMENTS

Figure 4:
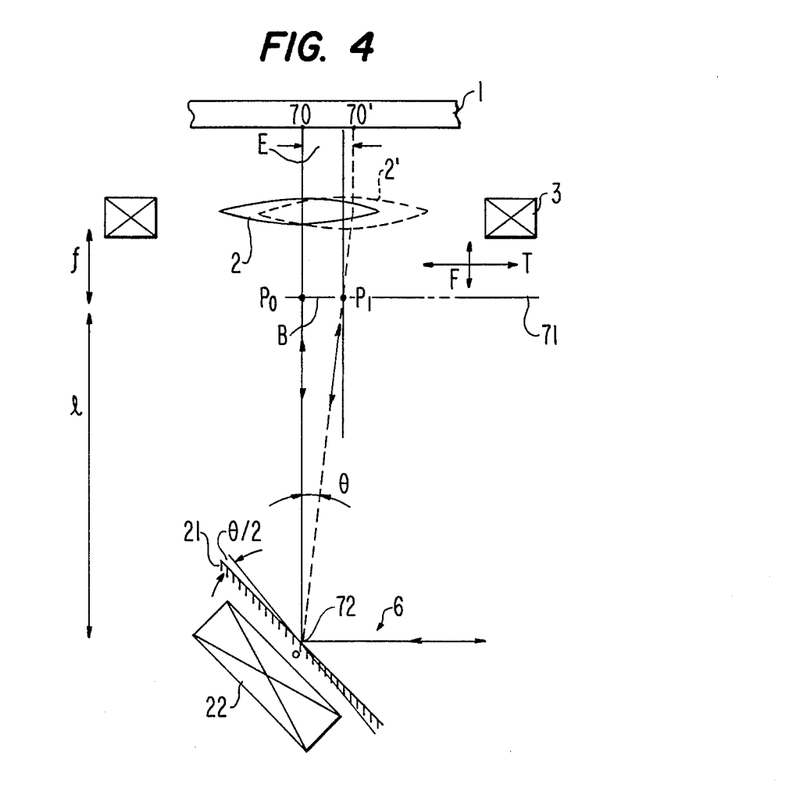
FIG. 4 is a schematic diagram of a tracking servo system for an optical storage apparatus in accordance with the present invention.

A tracking servo system for an optical storage system in accordance with the present invention will be described with reference to the schematic diagram of FIG. 4. The optical tracking servo system of the present invention includes a lens actuator 3 for driving the objective lens 2 and a mirror actuator 22 for driving a tilting mirror 21. The lens actuator simultaneously drives the objective lens 2 in a focusing direction F and a tracking direction T. In accordance with the present invention, lens 2 and mirror 21 are controlled by the respective actuators 3 and 22 so that a laser beam 6 incident on mirror 21 passes through the back focal point of lens 2, and thus proceeds from the lens 2 to the disk 1 in a direction perpendicular to the optical axis of the lens 2 to strike the disk 1 perpendicularly at the focal point 70 of lens 2. If the position of the track is shifted, the mirror 21 is rotated by an angle $\theta/2$, with respect to a plane at an angle of 45° to the plane of disk 1, so that the laser beam follows a beam path which makes an angle $\theta$ with a beam path perpendicular to disk 1, and lens 2 is shifted to position 2' so that the laser beam passes through the back focal point $P_1$, corresponding to lens position 2', and is incident of the disk 1 at focal point 70' of lens position 2'. Accordingly, the path of the laser beam which is reflected from the disk 1 coincides with the path of the laser beam which is incident on the disk 1. Consequently, the optical storage apparatus of the present invention eliminates beam shift.

The operation of the actuators 3 and 22 is controlled by a circuit for supplying current to drive coils in the actuators 3 and 22 so that the relationship between the angle of rotation ($\theta/2$) of mirror 21 and the displacement $\epsilon$ of the incident point of the laser beam from 70 to 70' always satisfies the following equations:

$$\epsilon = (l+f) \tan \theta \quad (1)$$

$$\text{or } \theta = \tan^{-1}(\epsilon/(l+f)) \quad (1')$$

wherein l is the distance between the center of rotation 72 of mirror 21 and a plane including the back focal point $P_0$ of lens 2, and f is the distance between the center of lens 2 and a plane including the back focal point of lens 2, i.e., the focal length of lens 2.

The displacement of lens 2, namely the distance $\beta$ between focal points $P_0$ and $P_1$ is given by the equation:

$$\beta = l \tan \theta \quad (2)$$

Thus far, it has been assumed that the surface of the optical disk 1 is always perpendicular to the optical axis of the objective lens 2, defining a so-called true plane of the disk. Beam shift also derives from skew of the disk, namely, an inclination of the surface of the disk from its true plane. It will be assumed that the inclination occurs only in the radial direction of the disk since this is the case under actual conditions where a slight concentric (radial) deformation of a disk due to its elasticity is bound to occur for thin optical disks.

Figure 5:
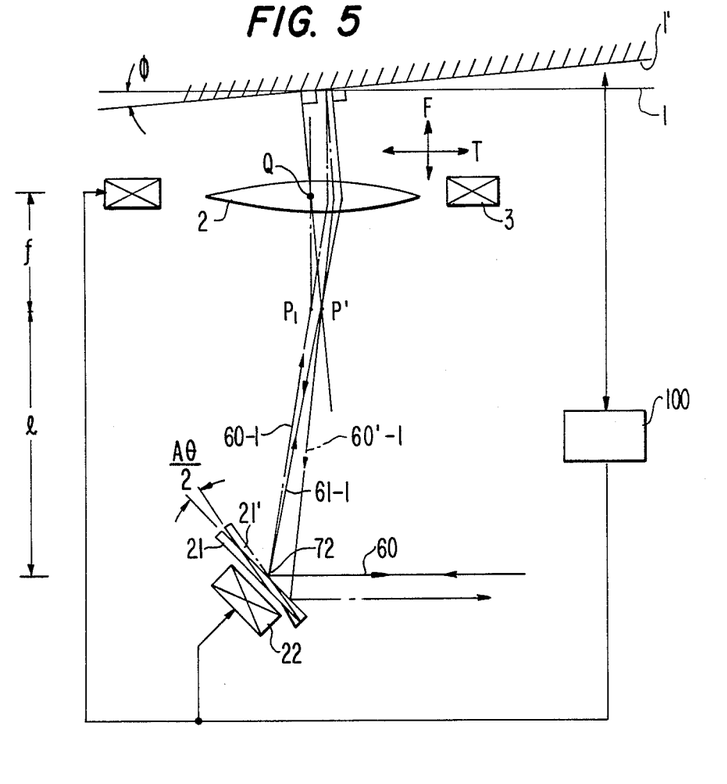
FIG. 5 is a schematic diagram for describing the operation of the tracking servo system shown in FIG. 4.

FIG. 5 is a block diagram for explaining the principle for eliminating beam shift caused by skew. In order to eliminate the beam shift caused by skew, a skew detector 100 is added to the optical storage apparatus. When disk 1 is perpendicular to the optical axis of lens 2, a laser beam 6 deflected by mirror 21 follows path 60-1, passing through the back focal point $P_1$ of lens 2, and strikes disk 1 perpendicularly thereto; accordingly, the reflected laser beam follows the same path and passes through the back focal point $P_1$. However, when a disk is inclined by an angle $\phi$, as shown by disk 1', a laser beam following path 60-1 and passing through the back focal point $P_1$ strikes the disk 1' at an angle $\phi$ to a normal to the surface of disk 1'. Consequently, the reflected laser beam cannot follow the incident path 60-1, but instead follows path 60'-1, thereby resulting in beam shift.

As shown in FIG. 5, a virtual back focal point P' of lens 2 is defined by the point where a line normal to the disk surface and passing through the center Q of lens 2 intersects the back focal plane of the lens 2. An incident laser beam passing through the virtual focal point P' will be perpendicular to the surface of the disk 1', thereby eliminating beam shift. Therefore, in order to eliminate beam shift caused by skew, mirror 21 must be rotated by an additional angle $\Delta\theta/2$ to position 21', where $\Delta\theta = \gamma/l$ and where $\gamma$ is defined by the following equation:

$$\gamma = P_1 - P' = f \tan \phi \approx f \phi \quad (3)$$

Generally, there is a limit angle $\theta_0/2$ of the rotating angle $\theta/2$ of mirror 21, i.e., an incident angle $\theta_0$ of the laser beam to the optical axis of lens 2 at which lens abberation occurs and satisfactory beam focusing becomes difficult, resulting in a maximum off-tracking distance $\epsilon_{max}$. The maximum off-tracking distance $\epsilon_{max}$ which can be achieved without lens abberation is improved by the apparatus of the present invention. For the conventional apparatus shown in FIG. 3 $\epsilon_{max} = f \tan$ $\theta_0/2$. On the other hand, for the present invention $\epsilon_{max}=(1+f)\tan\theta_0/2$. If the dimensions of the apparatus are $f=4.3$ mm and $l=20$ mm, the off-tracking distance can be extended by a factor of $(l+f)/f=5.6$.

For simplicity, the embodiments of the present invention will be described with the assumption that the disk 1 has tracks, or pregrooves, and that a "push-pull" method is adopted for generating tracking error signals.

Figure 6:
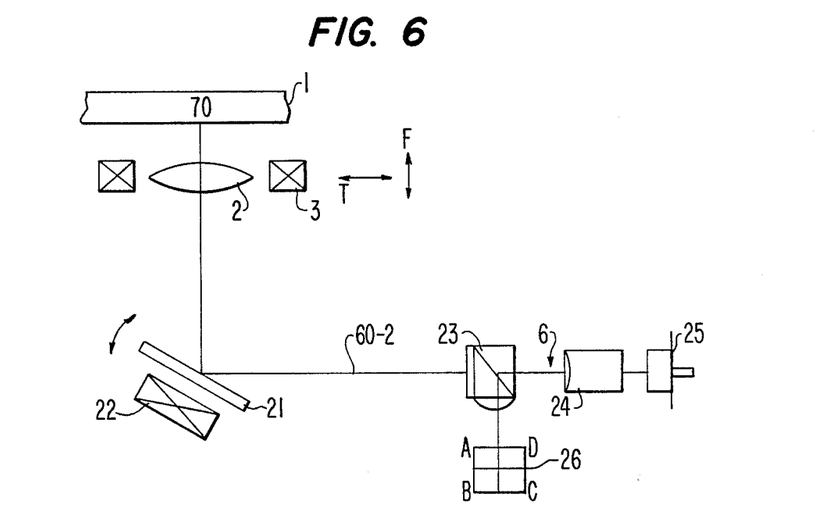
FIG. 6 is a schematic diagram of an optical storage apparatus in accordance with a first embodiment of the present invention including a tracking servo system and an optical system.

FIG. 6 is a block diagram of an optical storage apparatus according to a first embodiment of the present invention. The tracking servo system for the first embodiment of the present invention corresponds to the tracking servo system shown in FIG. 4. FIG. 6 also illustrates an optical system of the optical storage apparatus. In the optical system, a laser flux is emitted from a laser source 25. The laser flux is collimated by a collimating lens 24 to form a laser beam 6 having a circular cross section. The laser beam 6 emitted from the collimating lens 24 follows an optical path 60-2, passes through a polarizing beam splitter 23, is deflected by mirror 21, condensed by an objective lens 2, and incident on disk 1 at focal point 70 of the lens 2. Then, the laser beam is reflected by the surface of disk 1 and follows optical path 60-2 in the reverse direction. When the reflected beam reaches a polarizing beam splitter 23, a portion of the reflected beam is deflected by the polarizing beam splitter 23 and is incident on a photosensor 26 comprising four sub-photosensors A, B, C, and D. The sub-photosensors A, B, C, and D each have an output signal, denoted A, B, C, and D, respectively. Photoelectric currents generated by the sub-photosensors A–D are processed in a conventional manner to output tracking and focus error signals. The tracking and focus errors signals are used to drive the lens actuator 3 to move the lens in the tracking and focus directions.

Figure 7:
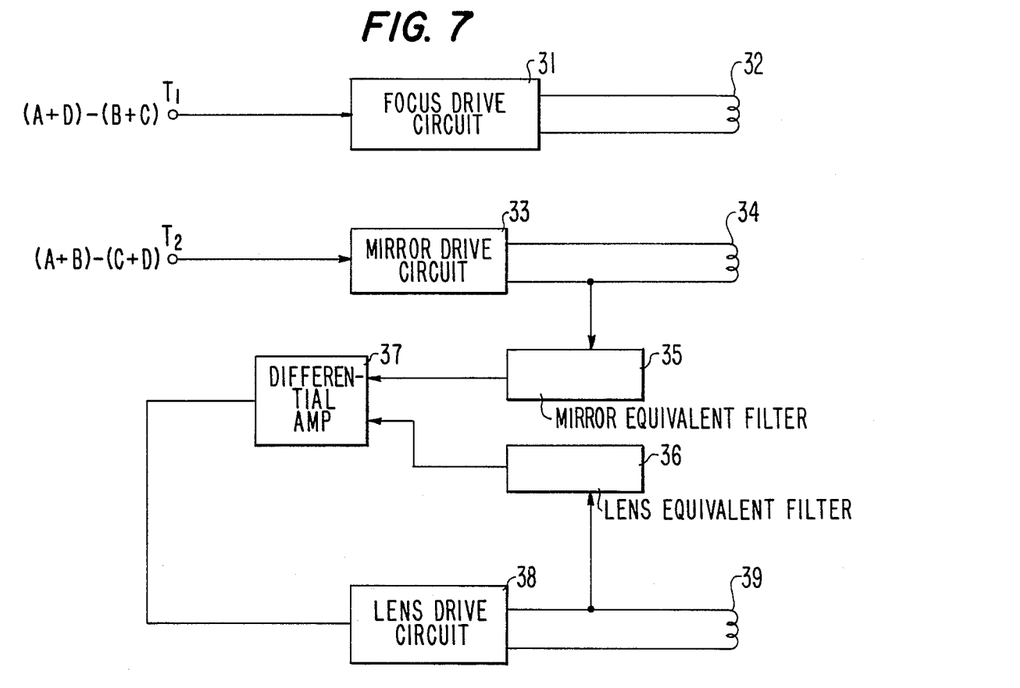
FIG. 7 is a block diagram of a signal processing system for use with the first embodiment of the present invention.

FIG. 7 is a block diagram of a circuit for operating the lens and mirror actuators 3 and 22. In particular, a focus error signal $(A+D)-(B+C)$ is input to a focus drive circuit 31 through a terminal $T_1$ which drives a focus coil 32 in lens actuator 3. A tracking error signal $(A+B)-(C+D)$ is input to a mirror drive circuit 33 through a terminal $T_2$ which drives a mirror coil 34 in the mirror actuator 22 to rotate the mirror 21 by an angle $\theta/2$ from the neutral position. Simultaneously, a signal corresponding to the current supplied to mirror coil 34 is supplied to a mirror equivalent filter 35 and converted to a mirror position signal corresponding to the angle $\theta/2$. Equivalent filter 35 further converts the mirror position signal to a target lens position signal satisfying the relation given by equation (2). The target lens position signal and an actual lens position signal output from a lens equivalent filter 36 are supplied to a differential amplifier 37, the actual lens position signal being generated by lens equivalent filter 36 in accordance with the current supplied to a lens coil 39. The differential amplifier 37 generates an output signal corresponding to the difference between the actual lens position and the target lens position. The output signal from the differential amplifier 37 is supplied to a lens drive circuit 38 which drives the lens coil 39 to displace the lens 2 by a displacement $\beta$ given by equation (2).

The operation of the circuit shown in FIG. 7 creates a feedback servo loop which controls the position of the lens 2 and the mirror 21 so that the optical path of the laser beam passes through the back focal point of lens 2.

It will be apparent to those skilled in the art that a feedback servo loop for controlling the position of the lens 2 and the mirror 21 can be accomplished in a different manner. For example, the current supplied to lens coil 39, to transfer lens 2 in the tracking direction T, and the current supplied to mirror coil 34, to rotate mirror 21 by an angle $\theta/2$, can be controlled to maintain a relation between the mirror angle $\theta/2$ and the off-tracking distance $\epsilon$ which satisfies equation (1) or (1').

The optical system of the first embodiment of the present invention, as illustrated in FIG. 6, utilizes only one laser source, simplifying the total system and lowering the cost of the device. However, the characteristics of the mirror and lens equivalent filters 35 and 36 are such that they do not always output signals correctly representing the relation between the relevant variables $\theta$, $\epsilon$ and $\beta$. In order to eliminate any errors caused by the servo loop, another optical source can be used instead of the equivalent filters.

Figure 8:
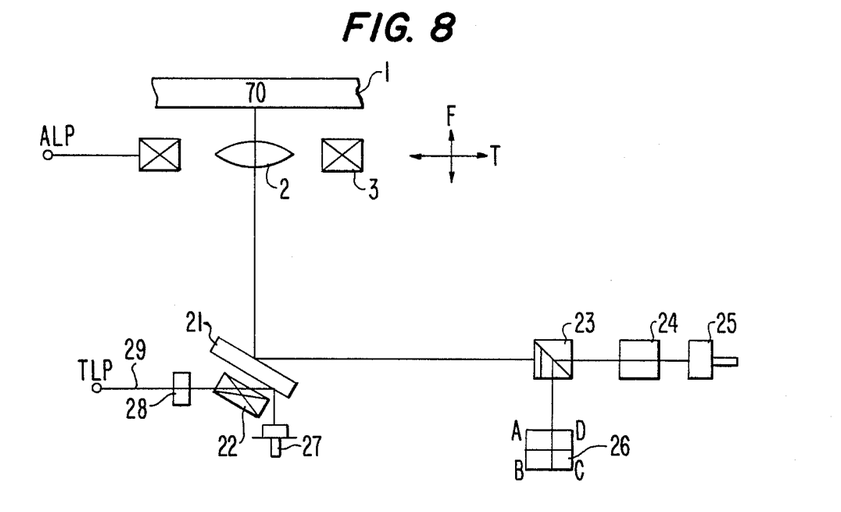
FIG. 8 is a schematic diagram of a second embodiment of the present invention including a second tracking servo system and a optical system.
Figure 9:
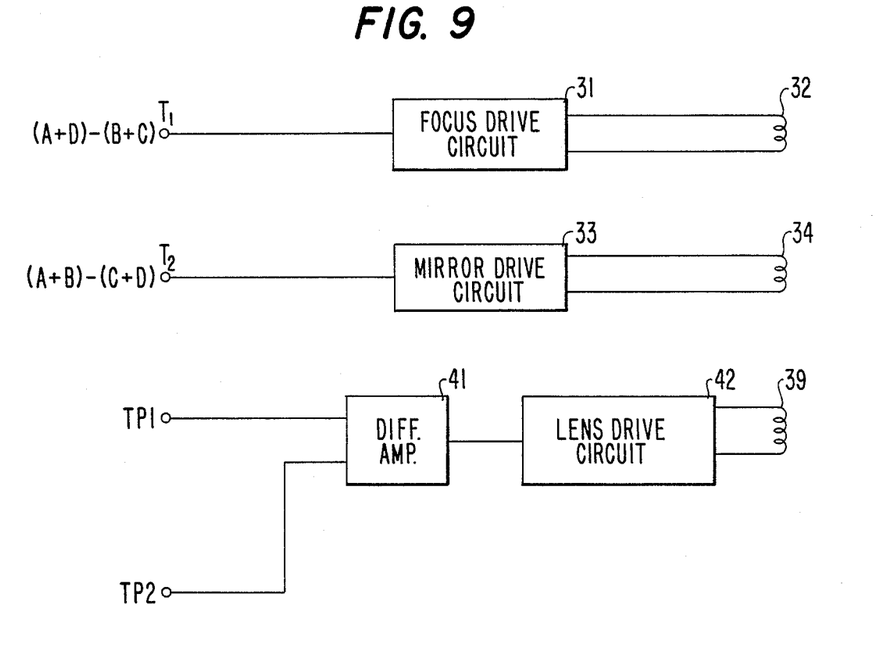
FIG. 9 is a block diagram of a signal processing system for use with a first and second embodiments of the present invention.

FIG. 8 is a schematic diagram illustrating a tracking servo system of a second embodiment of the present invention, and FIG. 9 is a block diagram of a circuit for operating the lens and mirror actuators 3 and 22 in the second embodiment. The optical elements of the optical storage apparatus illustrated in FIG. 8 are the same as those illustrated in FIG. 6, except for the addition of an optical system including an optical source 27 and a photosensor 28 for detecting the rotational angle $\theta/2$ of mirror 21 directly. In the signal processing circuit shown in FIG. 9, equivalent filters are not used.

In the operation of the optical system of the second embodiment, mirror 21 is rotated by an angle $\theta/2$ in accordance with a track error signal, $(A+B)-(C+D)$, by a mirror drive circuit 33 and a mirror coil 34. Then, the actual rotational angle of the mirror 21 is detected using a light emitting diode (LED) 27, which emits an optical beam 29, and a photosensor 28. The output of photosensor 28 is converted to a target lens position signal TLP in accordance with equation (2). An actual lens position signal ALP is generated directly from the current supplied to the lens coil 39. Signals ALP and TLP are supplied to a differential amplifier 41 at terminals TP1 and TP2, and the output of the differential amplifier 41 is supplied to the lens coil 39 through a lens drive circuit 42. Thus, the output of the differential amplifier 41 provides the servo loop with a feedback signal to position lens 2 so that equation (2) is satisfied. Accordingly, the second embodiment provides the tracking servo system with a more accurate and more sensitive feedback servo loop.

Figure 10:
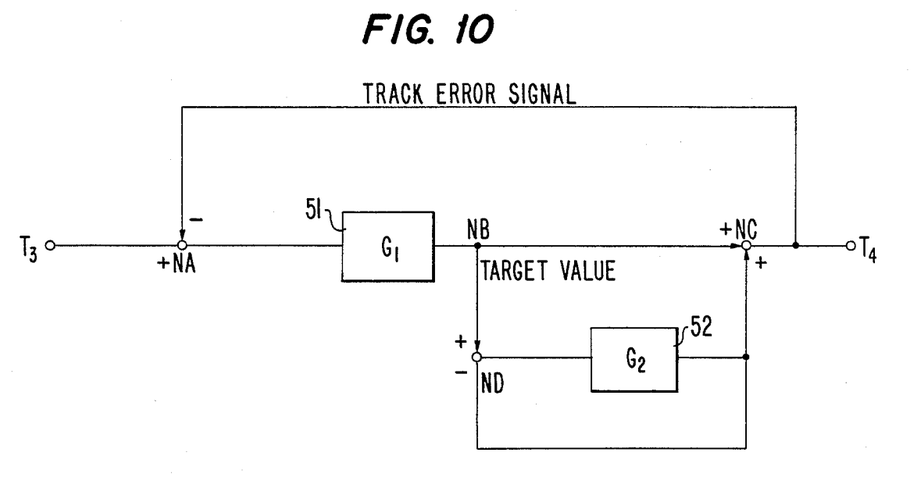
FIG. 10 is a block diagram of a feedback servo loop for use with the first and second embodiments of the present invention.

FIG. 10 is a block diagram of the feedback servo loop in the first and second embodiments. In FIG. 10 reference numeral 51 refers to a mirror transfer function $G_1$, and reference numeral 52 refers to a lens transfer function $G_2$. At node-point NA, a target value corresponding to the center of a target tracking and a tracking error signal are compared, and the difference thereof is used to control the position of a mirror. Simultaneously, a target mirror position signal provided at node-point NB and a lens position signal provided at node-point ND are compared, and the difference thereof is used to move lens 2 in the tracking direction T. At node-point NC, the laser beam displacement due to rotation of mirror 21 and transfer of lens 2 in the tracking direction are added to generate a tracking error signal. The tracking error signal is supplied to node-point NA, and thus a feedback loop is provided.

Figure 3:
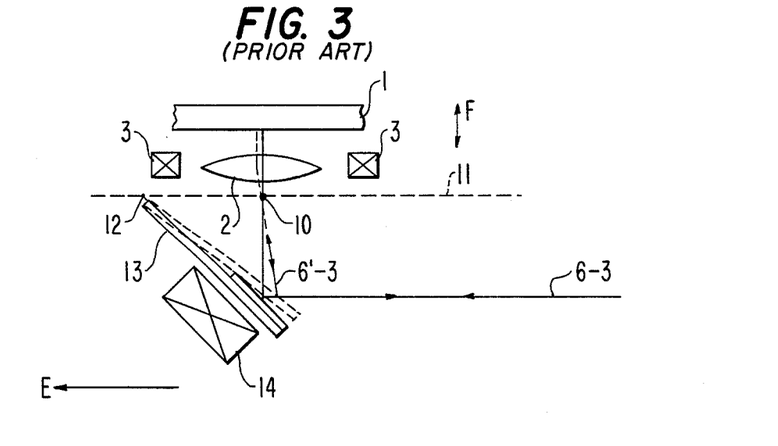
FIG. 3 is a schematic diagram of a further conventional tracking servo system for an optical storage apparatus.

One of the features of the present invention is that the size of its tracking servo system is greatly reduced with respect to the prior art system shown in FIG. 3. The prior art system shown in FIG. 3 utilizes a large rotating mirror 13, resulting in a rather large servo system and a low response speed. The characteristics of the mirror units, including the mirror and the mirror actuators, of the prior art system shown in FIG. 3 and the present invention are tabulated in the following table.

| Item | Prior Art | Embodiment |
| --- | --- | --- |
| mirror size (mm) | 30 × 30 × 30 | 25 × 10 × 15 |
| weight (gr) | 30 | 15 |
| Accelerating capability (Bl/m) | 150 | 1000 |
| Response capability (KHZ) | 2 | 5 |

Figure 11:
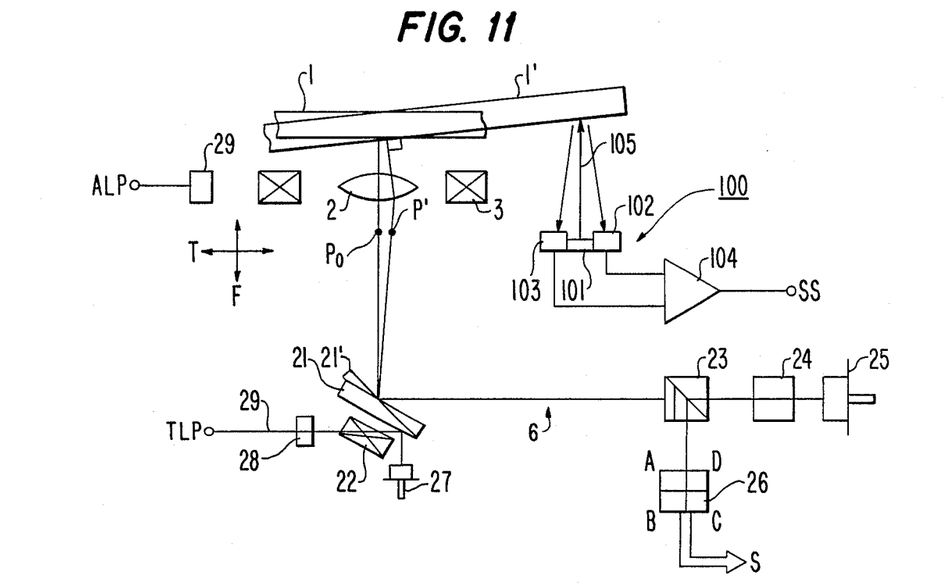
FIG. 11 is a schematic diagram of a third embodiment of the optical storage apparatus of the present invention, including a skew detector, a tracking servo system and an optical system.
Figure 12:
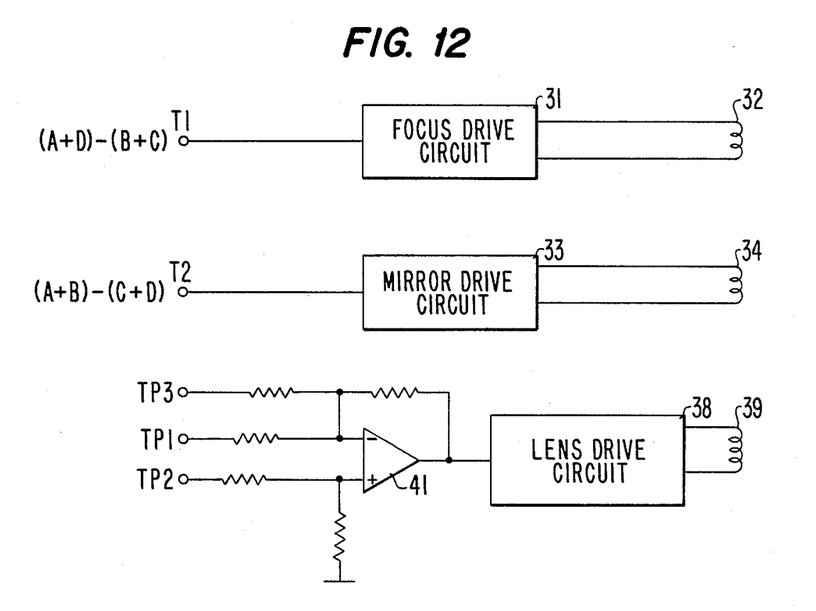
FIG. 12 is a block diagram of a signal processing system for use with the third embodiment of the present invention.

FIG. 11 is a block diagram of a third embodiment of the present invention having an improved tracking servo system including means for compensating for skew of a disk, and FIG. 12 is a block diagram of the control circuit for the third embodiment. The optical storage system of the third embodiment includes the elements of the second embodiment illustrated in FIG. 8, and further comprises a skew detector 100. The description and operation of common elements in the second and third embodiments will be omitted. The skew detector 100 includes an LED source 101, a pair of photosensors 102 and 103, and a differential amplifier 104. In the operation of the third embodiment, the LED source 101 emits a light beam which is reflected by the surface of the disk 1. When there is no skew, the photocurrents generated by photosensors 102 and 103 are balanced and an output signal SS of differential amplifier 104 is zero. When the disk has skew, as shown by disk 1', the photocurrents generated by photosensors 102 and 103 are unbalanced and the differential amplifier 104 outputs a skew signal SS approximately proportional to the inclination angle $\phi$ of the disk 1'.

The skew signal SS and the target lens position signal TLP are supplied to differential amplifier 41 of the circuit shown in FIG. 12 at terminals TP3 and TP1, respectively, to compensate for the shift of the lens 2 by the distance $\gamma$ given by equation (3). The sum of the signals SS and TLP are compared with the actual lens position signal ALP by differential amplifier 41, supplied at terminal TP2, and the output of differential amplifier 41 is supplied to lens drive circuit 38 which activates lens coil 39 to drive lens 2. Thus, the laser beam emitted from the laser source 25 and deflected by mirror 21 always passes through the virtual back focal point P' of lens 2 to alleviate beam shift due to skew of the disk.

Beam shift can be eliminated in another manner; in particular, the tracking error signal $(A+B)-(C+D)$ can be fed to the lens drive circuit 38 directly, and the skew signal SS can be fed to the mirror drive circuit 33 in combination with a target mirror position signal determined in accordance with equation (2) (the relevant circuit diagram is not shown).

As background for the discussion of a fourth embodiment of the present invention it is noted that the tracking servo system and optical system for an optical storage apparatus are carriage mounted. In general, tracking accessing is classified as coarse accessing and fine accessing; coarse accessing is performed by moving the carriage, and fine accessing is accomplished by controlling the laser beam, i.e., deflecting the laser beam using a tracking servo means.

Figure 13:
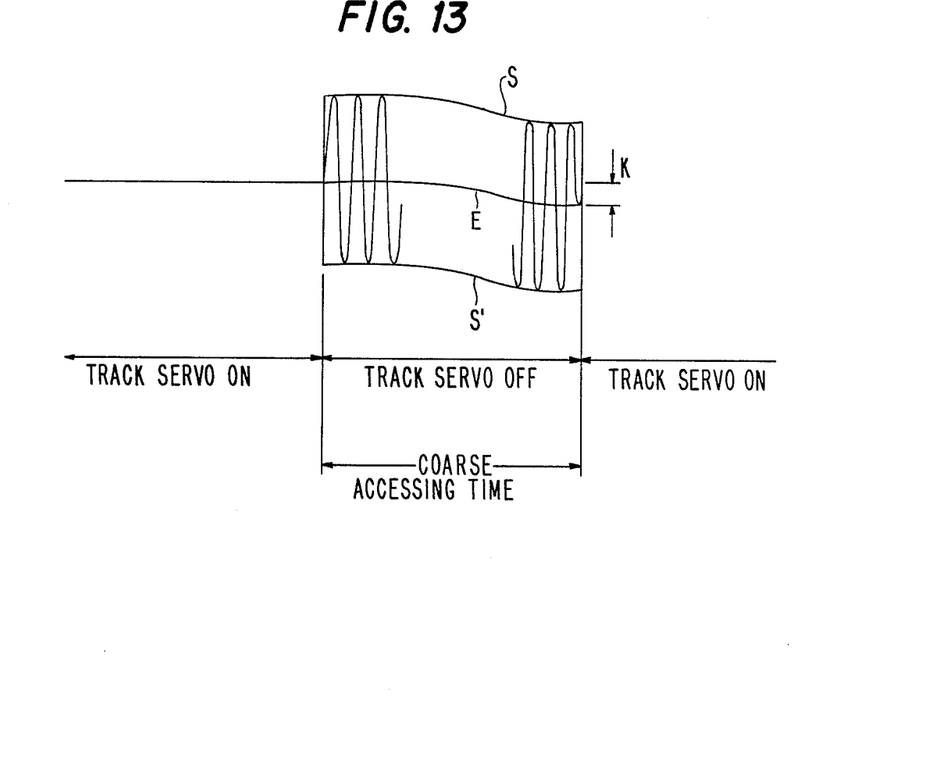
FIG. 13 is a diagram for explaining the waveform of a tracking error signal subject to offset by signals generated in accordance with skew of the disk.

In accordance with the fourth embodiment of the present invention, a second type of skew detector operates without the use of a separate optical beam, and an offset current of a tracking signal, generated in accordance with the skew of the disk, is utilized. The principal is described with reference to the diagram of a tracking signal in FIG. 13. In practice, off-tracking of the laser beam on a rotating optical disk occurs due to the eccentricity of the trackings, resulting in a deviation of the laser beam from the tracking center (offtracking). Consequently, as shown in FIG. 13, an actual waveform of a tracking signal obtained from a photosensor has an alternating wave shape having a frequency corresponding to the rotational speed of the disk. If the disk has skew, beam shift of the laser beam incident on the photosensor occurs, leading to a shift in the optical intensity distribution at a particular spot on the photosensor. Thus, an offset of the waveform of the tracking signal appears. The offset of the waveform is given by a center value E (average value) between a positive peak value S and a negative peak value S'. The offset is proportional to the beam shift, and thus the skew of the disk can be detected utilizing this offset of the waveform of the tracking signal. However, when the tracking servo loop is activated, the offset of the tracking signal is mixed with other position signals and cannot be separated. Therefore, the tracking servo loop must be disabled when the tracking signal offset is utilized as a skew signal. In practice, it is convenient to detect the tracking signal offset when the tracking servo loop is turned off during course accessing.

Figure 14:
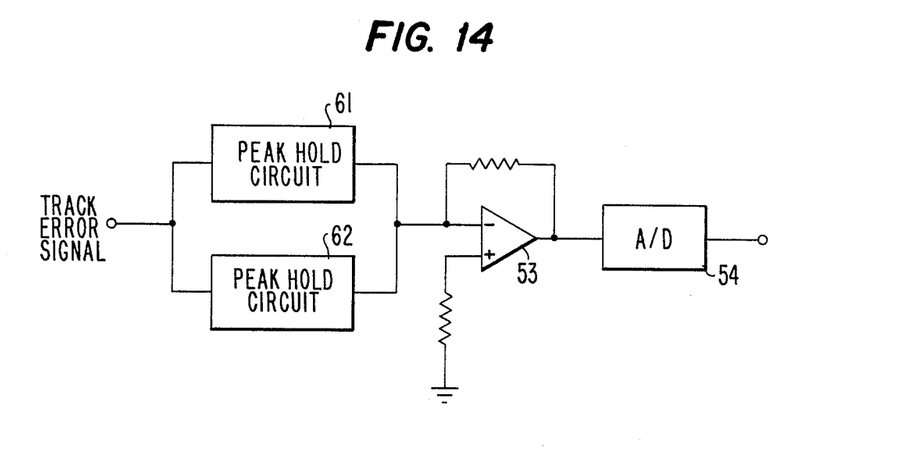
FIG. 14 is a block diagram of a circuit for detecting an offset value of a tracking error signal for use with a fourth embodiment of the present invention.

FIG. 14 is a block diagram of a circuit for detecting the offset value of a tracking signal. The positive and negative peak values S and S' are stored by peak-hold circuits 61 and 62, added by a comparator 53, and converted into a digital value by an analog to digital (A/D) converter 54. In this manner , a digital skew signal is obtained. The value of the skew signal immediately before the end of the course access time is stored by a storage means (not shown) and the stored value of the skew signal is used for the following tracking servo operation.

Figure 15:
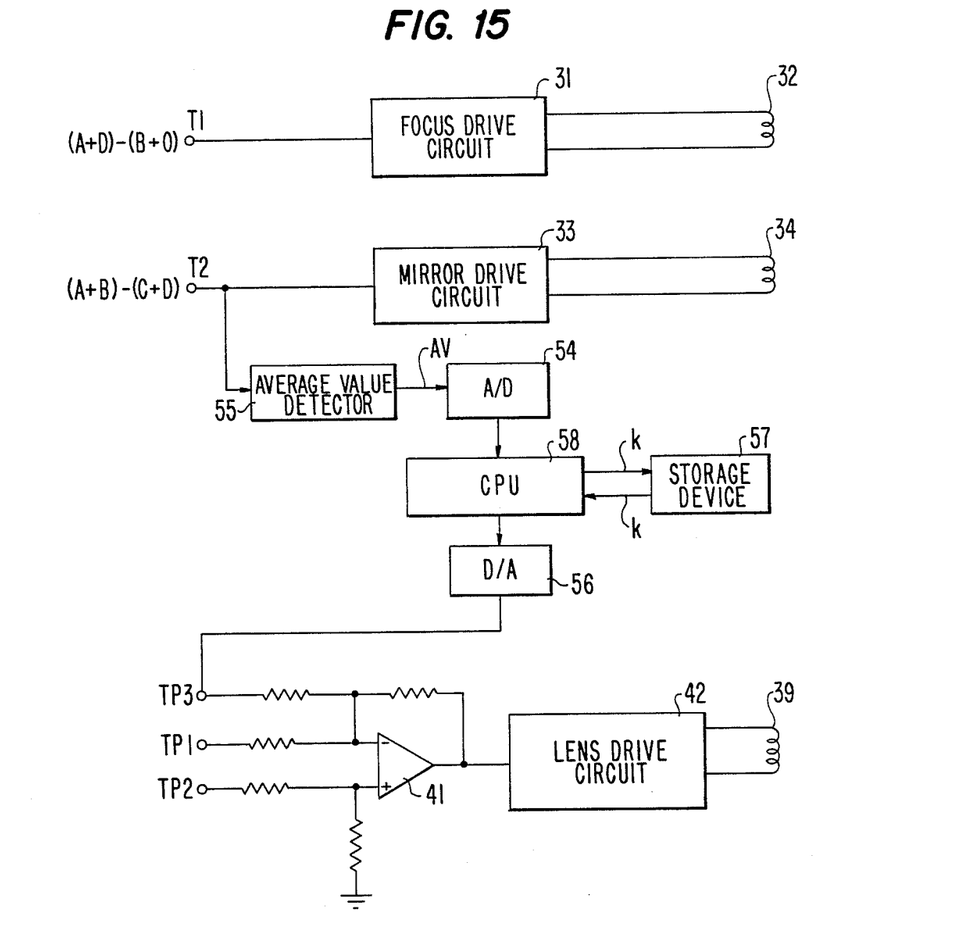
FIG. 15 is a block diagram of a signal processing system for use with the fourth embodiment of the present invention.

FIG. 15 is a block diagram of a control circuit having the skew detecting function of the fourth embodiment of the present invention. In operation, a digital skew signal is output from an average value detecting circuit 55, such as the circuit comprising elements 61, 62 and 53 of FIG. 14, and converted into a digital signal by an A/D converter 54. The skew signal corresponds to the offset k of the tracking signals, as shown in FIG. 13, and is stored in the storage or memory device 57. A skew signal SS' is then applied to differential amplifier 41 in combination with target lens position signal TLP. The subsequent processing and operation of the circuit shown in FIG. 15 is similar to that shown in FIG. 12, and thus will not be described in detail.

The control circuit of the fourth embodiment, as shown in FIG. 15, can also be used to determine the skew distribution along a radius of a disk which is to be read in advance of reading the information, and stored in the storage means 57 as a function of the tracking location or tracking number. Thereafter, during each reading or writing operation of the device, a skew signal corresponding to the tracking number is recalled from the stored information and utilized to compensate for the adverse effect caused by the skew of the disk.

The present invention may be embodied in other specific forms without departing from the spirit, or essential characteristics thereof. Thus, the presently disclosed embodiments are to be considered as illustrative and not restrictive. The scope of the invention is indicated by the claims, rather than the foregoing description, and all modifications which come within the scope and range of equivalency of the claims are, therefore, to be covered thereby.

What is claimed is:

1. A tracking servo system for controlling an optical beam to store information on and to read information from tracks on a rotatable optical disk, comprising:
   means for deflecting the optical beam towards the optical disk;
   means for focusing the optical beam on the optical disk, said focusing means having a back focal point on the opposite side of said focusing means from the optical disk and movable in a first plane perpendicular to the optical disk and in a second plane parallel to the optical disk;
   means for converting at least a portion of the optical beam reflected from the optical disk into photoelectric currents and, in response thereto, generating a tracking error signal; and
   control means, responsive to the tracking error signal, for controlling said deflecting means in cooperation with said focusing means so that the optical beam passes through the back focal point of said focusing means.

2. A tracking servo system according to claim 1, wherein:
   said control means controls said focusing means to transfer a distance $\beta$ along a plane substantially parallel with the plane of the optical disk; and
   said control means controls said deflecting means to rotate, about a point of rotation, by an angle $\theta/2$ from a plane rotated substantilly 45° from the plane of the optical disk, so that the relation $\beta = l \tan \theta$ is satisfied, where l is the distance between the point of rotation of said deflecting means and the back focal point of said focusing means.

3. A tracking servo system according to claim 1, further comprising means for detecting the rotational angle $\theta/2$ of said deflecting means and, in response thereto, generating a deflecting means position signal, wherein said control means includes a feedback servo loop controlling said deflecting means and said focusing means in accordance with the deflecting means position signal.

4. A tracking servo system according to claim 3, further comprising means for detecting a skew angle $\phi$ of the optical disk and, in response thereto, generating a skew signal, wherein said control means is responsive to the skew signal for rotating said deflecting means by an angle $\theta/2 + \Delta\theta/2$, where $\Delta\theta/2$ satisfies the relation $\Delta\theta/2 = (f \tan \psi)/2l$, and where f is the focal length of said focusing means.

5. An optical storage apparatus for storing information on and reading information from tracks on a rotatable optical disk with a first optical beam, comprising:
   means for generating the first optical beam;
   a mirror, having a center and a point of rotation about said center, for deflecting the first optical beam towards the optical disk;
   mirror actuating means for rotating the mirror about said point of rotation;
   an objective lens for focusing the first optical beam on the optical disk, the objective lens having a back focal point on the opposite side of said objective lens from the optical disk;
   objective lens actuating means for transferring said objective lens along a plane substantially parallel with the optical disk;
   first photosensor means for converting at least a portion of the optical beam reflected by the optical disk into photoelectric currents; and
   contol means, responsive to the photoelectric currents generated by said first photosensor means, for generating a tracking error signal, and for controlling said mirror actuating means in cooperation with said objective lens actuating means to rotate said mirror and to transfer the objective lens so that the first optical beam passes through the back focal point of said objective lens in accordance wth the tracking error signal.

6. An optical storage apparatus according to claim 5, wherein:
   said mirror actuating means rotates said mirror by an angle $\theta/2$ from a plane rotated substantially 45° from the plane of the optical disk;
   said objective lens actuating means transfers said objective lens by a distance $\beta$; and
   said control means controls said mirror actuating means and said objective lens actuating means so that the relationship $\beta = l \tan \theta$ is satisfied, where l is the distance between the rotational point of said mirror and the back focal point of said objective lens.

7. An optical storage apparatus according to claim 5, further comprising means for detecting the rotational angle of said mirror and, in response thereto, generating a mirror position signal, wherein said control means includes a feedback servo loop for controlling said mirror actuating means and said objective lens actuating means in accordance with the mirror position signal.

8. An optical storage apparatus according to claim 7, wherein said mirror has a front surface for deflecting the first optical beam, a back surface parallel to said front surface, and a reflecting surface formed on the back surface of said mirror, further comprising:
- means for generating a second optical beam directed toward the reflecting surface;
- second photosensor means, comprising at least two sub-photosensor means, for detecting the second optical beam reflected by said reflecting surface and, in response thereto, generating photocurrents; and
- means, responsive to the photocurrents generated by said second photosensor means, for comparing the photocurrents and, in response thereto, generating the mirror position signal.

9. An optical storage apparatus according to claim 8, further comprising means for detecting a skew angle $\Delta\theta$ of the optical disk and, in response thereto, generating a skew signal, wherein said control means is responsive to the skew signal for rotating said mirror by an angle $\theta/2 + \Delta\theta/2$, where $\Delta\theta/2$ satisfies the relation $\Delta\theta/2 = (f \tan \psi)/2l$ and where f is the focal length of said objective lens.

10. An optical storage apparatus according to claim 9, wherein said skew angle detecting means comprises:
- means for generating a third optical beam directed towards the optical disk;
- third photosensor means, comprising at least two sub-photosensors, for detecting the third optical beam reflected by the optical disk and, in response thereto, generating photocurrents; and
- means, responsive to the photocurrents generated by said third photosensor means for generating the skew signal.

11. A tracking servo system for controlling an optical beam to store information on and to read information from tracks on a rotatable optical disk, comprising:
- means for deflecting the optical beam towards the optical disk;
- means for detecting the rotational angle $\theta/2$ of said deflecting means and, in response thereto, generating a deflecting means position signal;
- means for detecting a skew angle $\phi$ of the optical disk and, in response thereto, generating a skew signal;
- means for focusing the optical beam on the optical disk, said focusing means having a back focal point on the opposit side of said focusing means from the optical disk;
- means for converting at least a portion of the optical beam reflected from the optical disk into photoelectric currents and, in response thereto, generating a tracking error signal; and
- control means, having a feedback servo loop, responsive to the tracking error signal, for controlling said deflecting means and said focusing means so that the optical beam passes through the back focal point of said focusing means and responsive to the skew signal for rotating said deflecting means, about a point of rotation, by an angle $\theta/2 + \Delta\theta/2$, where $\Delta\theta/2$ satisfies the relation $\Delta\theta/2 = (f \tan \psi)/2l$, and where f is the focal length of said focusing means and l is the distance between the point of rotation of said deflecting means and the back focal point of said focusing means, said feedback servo loop controlling said deflecting means and said focusing means in accordance with the deflecting means position signal.

12. An optical storage apparatus for storing information on and reading information from tracks on a rotatable optical disk with a first optical beam, comprising:
- means for generating the first optical beam;
- a mirror for deflecting the first optical beam towards the optical disk and having a front surface for deflecting the first optical beam, a back surface parallel to said front surface, and a reflecting surface formed on the back surface of said mirror;
- mirror actuating means for rotating the mirror about a rotational point;
- means for detecting the rotational angle of said mirror and, in response thereto, generating a mirror position signal;
- an objective lens for focusing the first optical beam on the optical disk, the objective lens having a back focal point on the opposite side of said objective lens from the optical disk;
- objective lens actuating means for transferring said objective lens along a plane substantially parallel with the optical disk;
- first photosensor means for converting at least a portion of the optical beam reflected by the optical disk into photoelectric currents; and
- control means, having feedback servo loop for controlling said mirror actuating means and said objective lens actuating means in accordance with the mirror position signal, responsive to the photoelectric currents generated by said first photosensor means, for generating a tracking error signal, and for controlling said mirror actuating means and said objective lens actuating means to rotate said mirror about a point of rotation, and to transfer the objective lens so that the first optical beam passes through the back focal point of said objective lens in accordance with the tracking error signal;
- means for generating a second optical beam directed toward the reflecting surface;
- second photosensor means, comprising at least two sub-photosensor means, for detecting the second optical beam reflected by said reflecting surface and, in response thereto, generating photocurrents;
- means responsive to the photocurrents generated by said second photosensor means, for comparing the photocurrents and, in response thereto, generating the mirror position signal; and
- means for detecting a skew angle $\Delta\theta$ of the optical disk and, in response thereto, generating a skew signal, wherein said control means is responsive to the skew signal for rotating said mirror by an angle $\theta/2 + \Delta\theta/2$, where $\Delta\theta/2$ satisfies the relation $\Delta\theta2 = (f \tan \psi)/2l$ and where f is the focal length of said objective lens and l is the distance between the point of rotation of said mirror and the back focal point of said objective lens.

13. An optical storage apparatus according to claim 12, wherein said skew angle detecting means comprises:
- means for generating a third optical beam directed towards the optical disk;
- third photosensor means, comprising at least two sub-photosensors, for detecting the third optical beam reflected by the optical disk and, in response thereto, generating photocurrents; and
- means, responsive to the photocurrents generated by said third photosensor means for generating the skew signal.

* * * * *